United States Patent Office 3,406,118
Patented Oct. 15, 1968

3,406,118
BRIGHTENER AGENT SOLUTIONS
Christopher J. Tscharner, Warwick, and Richard J. Pichler, Cranston, R.I., assignors to Geigy Chemical Corporation, Greenburgh, N.Y., a corporation of Delaware
No Drawing. Filed Mar. 31, 1965, Ser. No. 444,435
9 Claims. (Cl. 252—301.2)

ABSTRACT OF THE DISCLOSURE

Stable aqueous concentrates of an alkanolamine salt of 4,4'-bis-{[4-[3-sulfoanilino-6-[bis(2 - hydroxyethyl)amino]-1,3,5-triazine-2-yl]amino}-stilbene - 2,2' - disulfonic acid are prepared by converting the sodium salt thereof to a partial acid salt by salting out with ammonium chloride, converting the acid salt to a free acid by the addition of hydrochloric acid, and then reacting the resulting free acid with an alkanolamine.

---

This invention relates to the production of fluorescent compounds particularly useful as agents for whitening textile fibers, paper and the like. It is more especially concerned with the production of stable aqueous compositions containing such agents.

The operation of bleaching, or brightening, has been concerned for some time with the preparation of fabrics whose commercial value is dependent on the highest possible whiteness. Under the concept of bleaching, the textile converters and paper manufacturers understand all those upgrading procedures which are concerned with the removal of colored impurities or their conversion into colorless substances. On the other hand, with optical brighteners, an optical compensation for the yellow cast is involved. The yellow cast is produced by the absorption of short-wavelength light (violet to blue). With optical brighteners this lost light is replaced, in part, and thus a substantially complete white is attained. This additional light is produced by the brightener by means of fluorescence. Optical brightening agents (also referred to as "fluorescent bleaches" or "optical whitening agents") absorb the ultra-violet portion of the daylight spectrum invisible to the eye, and convert the energy thus taken up into the longer-wavelength visible portion of the spectrum, i.e. into blue to blue-violet light.

In U.S. Patent 3,025,242, there is described a group of whitening agents derived from stilbene and sulfanilic acid. This patent refers to isomeric agents in which metanilic acid is used in lieu of sulfanilic acid with the result that such agents do not form stable solutions. According to the present invention, effective whitening agents may be prepared from metanilic acid, and such agents form stable commercial solutions, using the special techniques and materials as set forth hereinafter.

It is one of the objects of this invention to produce highly effective whitening agents. It is another object to prepare such agents which are relatively free from sodium chloride and similar deleterious by-products. It is a further object to produce whitening compositions which are stable aqueous solutions, even at temperatures of about 0° C. It is yet another object to manufacture these fluorescent products by simple and economical methods. Other objects will be apparent from the following description of the invention.

All of these objects are attained by preparing a stable aqueous solution of an alkanolamine salt of 4,4'-bis-{4-[3-sulfoanilino - 6 - [bis(2 - hydroxyethyl)amino]-1,3,5-triazin-2-yl]amino}-stilbene-2,2'-disulfonic acid which can be represented by the following structural formula:

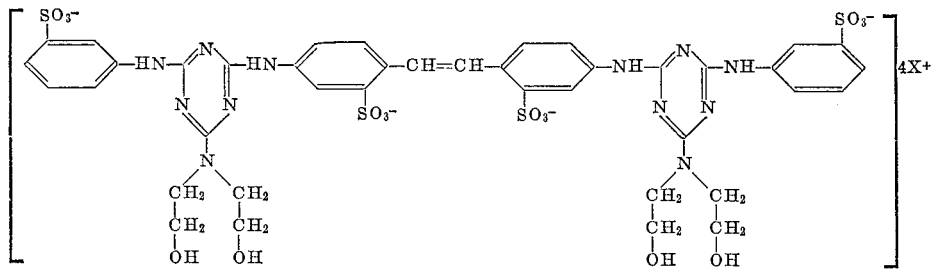

wherein X is alkanolamine cation. These stable solutions are relatively free of NaCl (i.e., less than 6% of the weight of the free acid or less than 1% of the brightener solution). Typical alkanolamines include the mono-, di- and triethanolamines; mono-, di- and tributanolamines derived from 1-butanol, 2-butanol, or 1-methyl-2-propanol; N-methyldiethanolamines; N,N - dimethylethanolamine; and N,N-diethylethanolamine.

In practice, the sodium salt of this sulfonic acid is first prepared in aqueous solution, the sodium salt is converted to a partial acid-salt by salting out with ammonium chloride, the precipitated acid-salt is converted to the acid by treatment with hydrochloric acid and the resultant acid is then reacted with an alkanolamine, to give the desired whitening agent.

The following specific embodiments illustrate the invention without limitation to the details set forth. Parts and percentages, where mentioned, are by weight.

The sodium salt of the metanilic acid substituted stilbene-2,2'-disulfonic acid referred to above may be prepared by any of the well-known suitable methods described in the prior art, e.g., those set forth in British Patent No. 841,189 or Japanese patent of 1958, No. 7,638. An aqueous solution of the sodium salt is then reacted with about 15–20 percent of ammonium chloride to precipitate out the partial acid-salt as a slurry. During the addition of the NH₄Cl, the solution is kept below about 30° C. (about 25° C.) to prevent formation of insoluble gum and lumps. While maintaining the partially acidified slurry at less than about 30° C. (about 25° C.), hydrochloric acid is added until the slurry has a pH of about 2.0. The slurry of acid thus formed is then filtered. The filter-press cake containing about 30–35% acid and about 70–65% water, is reacted with diethanolamine to form the diethanolamine salt of the sulfonic acid in an aqueous solution containing about 15% of the salt brightener and boiling of the solution at 120–125° C. in order to remove the undesired ammonia. The solution thus prepared is relatively free of NaCl, containing less than 1% thereof. Such solutions are stable at about 0° C. in that they exhibit no phase separation if the solution is frozen and then thawed at about 5° C.

If it be desired to free the acid substantially completely of sodium chloride, the filter-press cake may be washed with an aqueous ammonium chloride solution. One of the outstanding characteristics of the acid crystals formed by HCl acidification as described herein, is that such crystals are of a form to be easily filtered and, if desired, washed. This acidification is carried at pH 4.0–1.0 and preferably about pH 2.0. It has further been found that other acids, e.g., sulfuric, are not as successful for acid formation. Likewise, other ammonium salts, e.g., ammonium sulfate, are not as effective as ammonium chloride, to give end products which form stable aqueous concentrates. The salting out and acidification steps are preferably carried at a temperature of about 25° C. but these temperatures may be varied without deleterious effects, from 0° to 30° C. The soluble salt to be treated in the salting-out operation may be the potassium salt instead of the sodium salt and the same considerations with respect to the potassium chloride formed apply as in the case of the sodium chloride.

The alkanolamine salts in aqueous solution are sufficiently stable for commercial use without further additions. In some instances, where the salt brightener solutions may be subjected to unusual conditions of storage or when the wet acid cake was not washed substantially NaCl free, the brightener compositions may be modified by inclusion of special solvating and/or stabilizing agents. Dimethylformamide, in amounts up to 10% and preferably in amounts of 5–10%, is typical of such materials.

Other suitable changes and variations may be adopted where desired without departing from the spirit and scope of the invention as defined in the claims.

What is claimed is:

1. The process of producing a stable readily dilutable composition adapted for use as a brightening agent on cotton fibers, paper and the like, which comprises preparing an aqueous solution of an alkali metal salt of 4,4'-bis{4-[3 - sulfoanilino]- 6 - [bis(2 - hydroxyethyl) amino]- 1,3,5-triazin - 2 - yl]amino} -stilbene-2,2'-disulfonic acid, while maintaining the solution below 30° C. adding ammonium chloride in an amount sufficient to precipitate out the partial acid-salt as a slurry, acidifying the slurry at about 30° C. to 0° C. by addition of hydrochloric acid to pH 4.0–1.0, filtering the slurry and reacting the wet filter-cake with an alkanolamine and boiling the mixture to produce an aqueous solution of about 15% of the alkanolamine salt of the disulfonic acid, said solution being relatively free of alkali metal chloride.

2. The process of claim 1 in which the filter-cake is washed with an ammonium chloride solution to remove substantially all occluded sodium chloride, before reacting with the alkanolamine.

3. The process of claim 1 in which the alkanolamine salt reaction is conducted for a time and at a temperature sufficient to remove any ammonia formed in the solution.

4. The process of claim 1 in which the salting out with ammonium chloride and the acidification with hydrochloric acid are each carried out at a temperature of about 25° C.

5. The process of claim 1 in which the hydrochloric acid is added to pH 2.0.

6. The process of claim 1 in which the alkali metal salt of the disulfonic acid is the sodium salt.

7. The process of claim 1 in which the alkanolamine is diethanolamine.

8. The process of claim 1 in which the alkanolamine is monoethanolamine.

9. The process of claim 1 in which the hydrochloric acid acidification forms 4,4'-bis{4-(3-sulfoanilino) -6- [bis(2 - hydroxyethyl)amino]-1,3,5-triazin-2-yl] - amino} -stilbene -2,2'-disulfonic acid.

References Cited
UNITED STATES PATENTS

| | | |
|---|---|---|
| 3,025,242 | 3/1962 | Seylor. |
| 3,211,665 | 10/1965 | Allen et al. |
| 3,239,513 | 3/1966 | Hausermann. |

HELEN M. McCARTHY, *Primary Examiner.*

R. D. EDMONDS, *Assistant Examiner.*